(12) United States Patent
McDonnell et al.

(10) Patent No.: US 6,778,506 B1
(45) Date of Patent: Aug. 17, 2004

(54) LOOP PREVENTION IN NETWORKS

(75) Inventors: Edward McDonnell, Bristol (GB);
 Alistair Neil Coles, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,510

(22) Filed: Apr. 27, 2000

(30) Foreign Application Priority Data

Apr. 27, 1999 (GB) ............................................. 9909626

(51) Int. Cl.$^7$ .......................... H04L 12/28; H04L 12/56
(52) U.S. Cl. ..................................... 370/256; 370/397
(58) Field of Search ................................ 370/254–256, 370/390, 397, 400–402, 408, 466, 409; 340/825.02, 825.51

(56) References Cited

U.S. PATENT DOCUMENTS 5,717,687 A   2/1998   Minot et al. ................. 370/257

FOREIGN PATENT DOCUMENTS

| EP | 0 582 373 A2 | 2/1994 | ........... H04L/12/28 |
| JP | 11074889 | 3/1999 | |
| JP | 0964552 | 12/1999 | |
| WO | WO 98/17031 | 4/1998 | ........... H04L/12/28 |

OTHER PUBLICATIONS

Anderson, D. (1998), "Firewire System Architecture", pp. 261–284.
Search Report Dated Oct. 23, 2002, in Corresponding to EP 00303325.
Extract from *Routing Algorithm Issues*, pps. 222–223, 1992.

*Primary Examiner*—Duc Ho
*Assistant Examiner*—Phuongchau Ba Nguyen

(57) ABSTRACT

Logical connections between nodes in a network can be established by the following steps: generation of an identifier by each group of logically connected nodes in the network; exchange of identifiers between physically connected groups of logically connected nodes; and establishment of logical connections between physically connected groups of logically connected nodes for which the exchanged identifiers differ. Repeatedly carried out, these steps can allow a network without logical loops to be built up from individual nodes.

8 Claims, 1 Drawing Sheet

LOOP PREVENTION IN NETWORKS

FIELD OF INVENTION

The present invention is relevant to the prevention of loops in a network. It is particularly relevant to provision of a loopless logical network (especially one in which all nodes are connected) from a physical network which contains loops.

The invention has particular relevance to architectures according to the developing IEEE1394b networking standard.

Prior Art

The IEEE1394 family of standards relate to a bus architecture with a high degree of dynamic configurability. Information relating to these standards can be obtained from the Institute of Electrical and Electronics Engineers, Inc.

In IEEE1394a it is mandated that the wiring topology should not contain any loops otherwise the bus will not function. In this context a loop is defined to be the presence of two or more independent connection paths to a given node via any number of other nodes. As an enhancement for IEEE1394b it is proposed that there should be a mechanism in place which automatically detects the presence of any loops and logically removes them from the bus topology.

Summary of Invention

The invention provides a method for establishing logical connections between nodes in a network, comprising: generation of an identifier by each group of logically connected nodes in the network; exchange of identifiers between physically connected groups of logically connected nodes; and establishment of logical connections between physically connected groups of logically connected nodes for which the exchanged identifiers differ.

In a further aspect, the invention provides method of establishing a network topology without logical loops, comprising: a/ commencing with physical connections, but no logical connections, between nodes; b/ carrying out the method of establishing logical connections as indicated above to provide groups of logically connected modes; and c/ repeatedly carrying out step b/ until all nodes are logically connected.

DESCRIPTION OF FIGURES

A specific embodiment of the invention is described below, by way of example, with reference to the accompanying drawings, in which.

DESCRIPTION OF SPECIFIC EMBODIMENT

Figure 1:
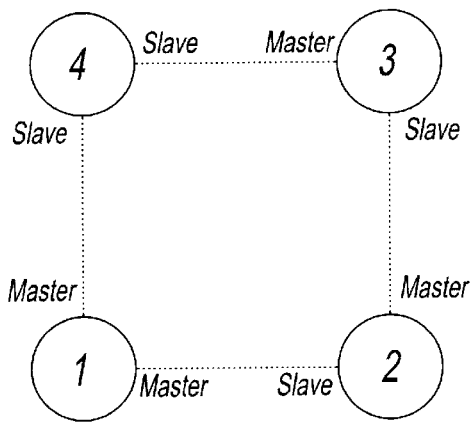
FIG. 1 shows an example of a four node topology without established logical links.

A distributed algorithm is described which takes nodes connected in an arbitrary topology (which may initially contain loops) and discovers another topology which is free of loops while ensuring that all nodes are connected together.

This topology discovery algorithm is 'organic' in the sense that it begins at the individual node level and grows by establishing connections to other nodes providing that a loop is not formed. As loop-less clusters of nodes form (called islands) they themselves grow by coalescing with other nodes or islands again providing that doing so does not form a loop. This process continues until all ports with physical connections on every node have been examined and are either active or disabled.

An island is defined here as a connected group of nodes that does not contain any logical loops. In the limit an island can consist of a single node The term "unique identifier" is here used for the best-effort unique identifier (BID) which is generated by each node. This BID is a number that ideally is unique to each node but practically may be some combination of a random number and other numerical identifiers in a node. In an island the island itself assumes a BID which is communicated to and common to all nodes and ports in the island "Soft reset" is here used for a reset which invokes the tree ID process without changing the bus topology A "Ping" is a special packet that is sent to a node with a specified address on the bus. The node specified by the address acknowledges receipt of the packet by replying to the sender It is assumed in the embodiment of the method described here that each node generates a best-effort unique identifier (BID), but that this BID is common to all nodes and ports in an island, that a node can enable or disable any of its ports.

An algorithm to implement such a method is described below. The algorithm relies on the concept of a cost metric to discriminate between competing physical connections at a node. The 'best' or least cost competitor could be defined in many ways. One possible definition is used in the algorithm description below where: if BID(x)<BID(y) then x is master and y is slave Topology Discovery Algorithm /* Negotiate master-slave relationship between two islands (note: the master-slave negotiation is based on a BID exchange that is common to all nodes and ports in an island) */

Exchange BIDs

---

```
ifBID(x) < BID(y) {
    x is nominated master and y is nominated slave
    /* also implies that nodes come from separate islands */
}
else ifBID(x) == BID(y){
    /* either have randomly chosen the same BIDs or there is a potential
```

-continued

```
        loop. Test for the presence of a loop: if after pinging it is discovered
        that a loop does not exist then each island refreshes its BID (in a yet to-
        be-determined way). Return to start of 'exchange BIDs' routine */
        Send ping packet
        zfloop does not exist{
            each island refreshes its BID
            return to "exchange BIDs"
        }
        else loop exists {
            send ping packet /* to verify existence of loop */
        }
    }
}
masterport arbitrates for its bus
if master is granted bus{
    no other port on bus/island can proceed with connects
    master port requests slave to arbitrate for its bus
    if slave is granted bus{
        make definite the master-slave connection
        do a soft reset
        unify the BIDs of the two islands
        /* how? config. Packet? */
    }
    if slave not granted bus{
        cannot proceed
    }
}
if master is not granted bus{
    cannot proceed
}
```

As an example of the operation of the algorithm, FIGS. 1 to 4 illustrate the progress of the algorithm on a four-node network which contains a loop.

FIG. 1 shows a basic four-node topology. The physically-connected nodes have exchanged BIDs and master-slave (M, S) port designations have been made according to the algorithm. The links between nodes are shown dashed to signify that they have not been logically established—although they are physically present.

Figure 2:
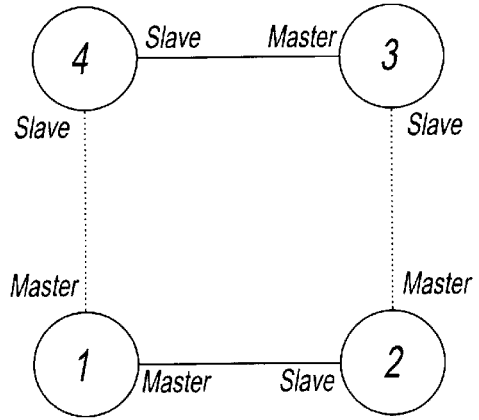
FIG. 2 shows the topology of FIG. 1 with first logical links established by means of a method according to an embodiment of the invention.

FIG. 2 shows the position for the network of FIG. 1 after node 1 has arbitrated for and been granted its bus. Node 1 has then requested node 2 (its slave) to arbitrate for the bus which in turn has been successful. Therefore the link between nodes 1 and 2 can now be logically established. The same process takes place between nodes 3 and 4.

Figure 3:
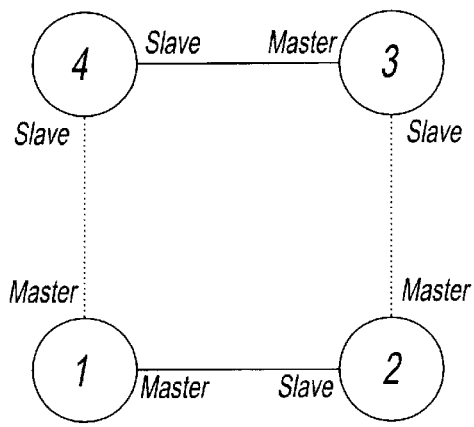
FIG. 3 shows the topology of FIG. 1 during a second iteration of the method according to an embodiment of the invention.

FIG. 3 shows the position after the upper and lower pairs of nodes (islands) carry out a soft reset and each island generates a best-effort unique BID. Both islands now attempt to grow their connections: node 1 by examining the link to node 4 and node 2 by examining the link to node 3. Nodes 1 and 2 arbitrate for their bus and for the sake of example assume that node 1 wins and is granted the bus (this inhibits the node 2-node 3 dialogue). The process outlined above in respect of FIG. 2 now takes place between nodes 1 and 4.

Figure 4:
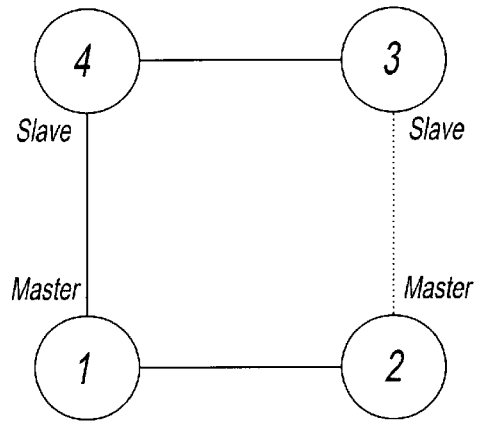
FIG. 4 shows the topology of FIG. 3 after the second iteration of the method according to an embodiment of the invention.

FIG. 4 shows a position in which the link between nodes 1 and 4 is now established, a soft reset takes place and the enlarged island composed of nodes 1, 2 and 3 assumes a unified BID. Node 2 now attempts to establish the link to node 3. However, the BIDs of nodes 2 and 3 are now the same therefore node 2 suspects the presence of a loop and sends a ping packet on its other port. The ping packet is received by node 3 and is acknowledged. Node 2 is now aware that establishing the node2-node3 link would create a loop and disables that port.

For the case illustrated in FIG. 3 above, if both islands randomly assume the same BID then the algorithm encounters perfectly symmetrical islands. A ping packet sent from node 1 ostensibly to node 4 is received and acknowledged by node 2 which has the same node ID and BID as node 4. This also happens with node 3 to node 2 ping packets. The algorithm now assumes the presence of a loop and disables the ports linking nodes 1 and 4 and then nodes 2 and 3. The two islands therefore remain separate and isolated.

This problem, however, does not arise if each island has a genuinely unique BID or if a single unique BID exists somewhere on the bus. This latter condition arises because a genuinely unique ID can ultimately propagate its dominance through a topology. For example, even though a stalemate condition exists because separate islands have assumed the same BID, a unique BID island will cause one of these islands to be assimilated and this new larger island will then assume the unique BID. By induction this process continues until all islands are assimilated by the unique BID. This process is illustrated in FIG. 5.

Figure 5:
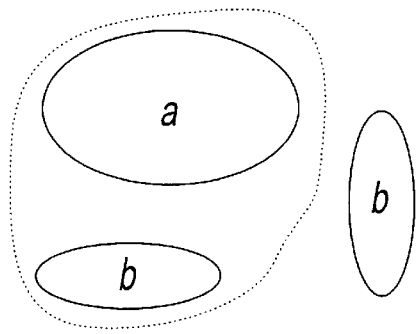
FIG. 5 shows a topology with two groups of nodes with a common identifier, and a further group with a different identifier

FIG. 5 shows an arrangement in which there are two islands that have assumed the same BID value of 'b' and another island with a different BID value of 'a'. The two islands with a BID value of 'b' will remain separate for the reasons outlined in the text. However, the island with BID value 'a' can assimilate one of the BID='b' islands (shown by a dotted line). This new island—providing it does not assume a BID value of 'b'—can then assimilate the other island.

Use of soft resets even after a "loop" has been detected may also assist with this problem.

What is claimed is:

1. A method for establishing logical connections between nodes of a plurality of group in a network, comprising:
    generation of an identifier by each group of logically connected nodes in the network;
    exchange of the generated identifiers between at least one pair of physically connected groups of logically connected nodes; and
    establishment of logical connections between said at least one pair of physically connected groups of logically connected nodes the exchanged of the generated identifiers are found to differ.

2. A method according to claim 1, wherein a group of logically connected nodes comprises at least one node.

3. A method according to claim 1, further comprising a step of checking for a loop if the exchanged of the generated identifiers for a pair of physically connected groups of logically connected nodes are the same.

4. A method according to claim 3, wherein if a loop does not exist, the steps of generating identifiers and exchange of the generated identifiers are repeated.

5. A method according to claim 3, wherein if a loop does exist, no new logical connection between the pair of physically connected groups of logically connected nodes is established.

6. A method of establishing a network topology without logical loops, comprising:

(a) commencing with physical connections, but no logical connections, between nodes;

(b) establishing logical connections to provide groups of logically connected nodes by generation of an identifier by each group of logically connected nodes in the network, exchange of the generated identifiers between physically connected groups of logically connected nodes, and establishment of logical connections between physically connected groups of logically connected nodes for which the exchanged of the generated identifiers differ; and (c) repeatedly carrying out (b) until all nodes are logically connected and a network topology is established.

7. A method according to claim 6, wherein a group of logically connected nodes may comprise a single node.

8. A method according to claim 6, further comprising a step of checking for a loop if the exchanged of the generated identifiers for a pair of physically connected groups of logically connected nodes are the same.

* * * * *